(12) United States Patent
Lee et al.

(10) Patent No.: US 6,256,081 B1
(45) Date of Patent: Jul. 3, 2001

(54) LCD OF HIGH APERTURE RATIO AND HIGH TRANSMITTANCE PREVENTING COLOR SHIFT HAVING TRANSPARENT PIXEL AND COUNTER ELECTRODES PRODUCING OBLIQUE ELECTRIC FIELDS

(75) Inventors: Seung Hee Lee, Kyoungki-do; Woo Ho Choi, Seoul; Tae Yong Eom, Kyoungki-do, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/320,082

(22) Filed: May 26, 1999

(30) Foreign Application Priority Data

May 29, 1998 (KR) ................................................. 98-19607

(51) Int. Cl.$^7$ ................................................. G02F 1/1343
(52) U.S. Cl. ................................................. 349/141
(58) Field of Search ................................. 349/42, 43, 132, 349/141; 345/92

(56) References Cited

U.S. PATENT DOCUMENTS

| | | | |
|---|---|---|---|
| 4,767,965 | 8/1988 | Yamano et al. | 313/491 |
| 5,598,285 | * 1/1997 | Kondo et al. | 349/42 |
| 5,646,705 | * 7/1997 | Higuchi et al. | 349/43 |
| 5,745,207 | * 4/1998 | Asada et al. | 349/42 |
| 5,946,066 | * 8/1999 | Lee et al. | 349/42 |
| 5,977,562 | * 11/1999 | Hirakata et al. | 349/141 |
| 6,088,078 | * 7/2000 | Kim et al. | 349/141 |

FOREIGN PATENT DOCUMENTS

| | | |
|---|---|---|
| 08064137 | 3/1996 | (JP) . |
| 9232646 | 9/1997 | (JP) . |
| 9311169 | 12/1997 | (JP) . |
| 10148826 | 6/1998 | (JP) . |

* cited by examiner

Primary Examiner—Walter J. Malinowski
(74) Attorney, Agent, or Firm—Ladas & Parry

(57) ABSTRACT

The present invention is directed to prevent color shift in liquid crystal display devices and to improve their aperture ratio and transmittance.

High aperture ratio and high transmittance liquid crystal display preventing color shift comprising: an upper substrate and a lower substrate opposed to be separated by selected distance; a liquid crystal layer including a plurality of liquid crystal molecules and interposed between inner surfaces of the upper and lower substrates; a first electrode formed on the inner surface of the lower substrate; and a second electrode formed on the inner surface of the lower substrate, wherein the first electrode and the second electrode form an electric field for driving the liquid crystal molecules; wherein in the absence of electric field between the first and second electrodes, the liquid crystal molecules are aligned such that their long axis are parallel to surfaces of the substrates in a first direction; wherein after a selected voltage is applied therebetween, first and second diagonal electric fields are simultaneously formed in a pixel, the two diagonal electric fields are formed to be symmetrical with respect to the first direction; wherein the first and second electrodes are made of transparent materials; wherein the distance between the first and second electrodes is shorter than the distance between the upper and lower substrates; wherein widths of the first and second electrodes are determined such that liquid crystal molecules overlying the two electrodes are driven by the electric field generated between the first and second electrodes.

20 Claims, 7 Drawing Sheets

LCD OF HIGH APERTURE RATIO AND HIGH TRANSMITTANCE PREVENTING COLOR SHIFT HAVING TRANSPARENT PIXEL AND COUNTER ELECTRODES PRODUCING OBLIQUE ELECTRIC FIELDS

FIELD OF THE INVENTION

The present invention generally relates to a liquid crystal display, and more particularly to a liquid crystal display of wide viewing angle preventing color shift and simultaneously improving its aperture ratio and transmittance.

BACKGROUND OF THE INVENTION

Liquid crystal display devices have been used in various information display terminals and video devices. The major operating system for the liquid crystal display device is the twisted nematic("TN") mode and the super twisted nematic ("STN") mode. Though they are commercially used in the market at present, the problems of narrow viewing angle remain unsolved.

An In-Plane Switching ("IPS") mode liquid crystal display has been suggested to solve foregoing problems.

As described in FIG. 1, a plurality of gate bus lines 11 are formed on a lower insulating substrate 10 along an x direction shown in the drawings. The gate bus lines 11 are parallel to each other. A plurality of data bus lines 15 are formed along an y direction which is substantially perpendicular to the x direction. Therefore a pixel region is defined. At this time, a pair of gate bus lines 11 and a pair of data bus lines 15 are shown in the drawing so as to define the pixel region. The gate bus line 11 and the data bus line 15 are insulated by a gate insulating layer(not shown).

A counter electrode 12, for example in the form of a rectangular frame, is formed within the pixel region and is disposed at the same plane with the gate bus line 11.

A pixel electrode 14 is formed at each pixel region where the counter electrode 12 is formed. The pixel electrode 14 consists of a web region 14a which divides the region surrounded by the rectangular frame shaped counter electrode 12 in the y direction, a first flange region 14b connected to one end of the web region 14a and simultaneously overlapped with the counter electrode 12 of the x direction, and a second flange region 14c which is parallel to the first flange region 14 and is connected to the other end of the web region 14a. Thus, the pixel electrode 14 appears like the letter "I". Herein, the counter electrode 12 and the pixel electrode 14 are made of opaque metal layers. To ensure an appropriate intensity of electric field, the widths of both the counter and pixel electrodes are preferably in the range of 10~20μm.

The pixel electrode 14 and the counter electrode 12 are insulated from each other by a gate insulating layer(not shown).

A thin film transistor 16 is disposed at the intersection of the gate bus line 11 and the data bus line 12. This thin film transistor 16 includes a gate electrode extended from the gate bus line 11, a drain electrode extended from the data bus line 15, a source electrode extended from the pixel electrode 14 and a channel layer 17 formed on the upper portions of the gate electrode.

A storage capacitor(Cst) is disposed at the region where the counter electrode 12 and the pixel electrode 14 overlap.

Although not shown in FIG. 1, an upper substrate(not shown) equipped with a color filter(not shown) is disposed on the first substrate 10 opposite to each other with a selected distance. Herein, the distance between the upper substrate and lower substrate 10 is smaller than the distance between the counter electrode region in the y direction and the web region of the pixel electrode thereby forming an electric field which is parallel to the substrate surface. Further a liquid crystal layer(not shown) having a plurality of liquid crystal molecules is interposed between the upper substrate(not shown) and the lower substrate 10.

Also, on the resultant structure of the lower substrate and on an inner surface of the upper substrate are formed homogeneous alignment layers respectively. By the homogeneous alignment layer, in the absence of electric field between the counter electrode 12 and the pixel electrode 14, long axes of liquid crystal molecules 19 are arranged parallel to the substrate surface. Also, by the rubbing axis of the homogeneous alignment layer, the orientation direction of the molecules 19 is decided. The reference R in the drawings means the direction of rubbing axis for the homogeneous alignment layer formed on the lower substrate 10.

A first polarizing plate(not shown) is formed on the outer surface of the lower substrate 10 and a second polarizing plate(not shown) is formed on the outer surface of the upper substrate(not shown). Herein, the first polarizing plate is disposed to make its polarizing axis to be parallel to the P direction of the FIG. 1. That means, the directions of rubbing axis R and polarizing axis P are parallel each other. On the other hand, the polarizing axis of the second polarizing plate is substantially perpendicular to that of the first polarizing plate.

When a scanning signal is applied to the selected gate bus line 11 and a display signal is applied to the data bus line 15, the thin film transistor 16 disposed adjacent to the intersection of the gate bus line 11 and the data bus line 15 is turned on. Then the display signal of the data bus line 15 is transmitted to the pixel electrode 14 through the thin film transistor 16. Consequently, an electric field E is generated between the counter electrode 12, where a common signal is inputted, and the pixel electrode 14. At this time, as the direction of electric field E is referenced as x direction as described in the FIG. 1, it has a predetermined degree of angle with the rubbing axis.

Afterward, when no electric field is generated, the long axes of the liquid crystal molecules are arranged parallel to the substrate surface and parallel to the rubbing direction R. Therefore the light passing through the first polarizing plate and the liquid crystal layer is unable to pass the second polarizing plate, and the screen shows dark state.

On the other hand, when the electric field is generated, the long axes(or short axes) are rearranged parallel to the electric field. Therefore the incident light passing through the first polarizing plate and the liquid crystal layer, passes the second polarizing plate, and the screen shows white state.

At this time, the direction of the long axes of the liquid crystal molecules change according to the electric field, and the liquid crystal molecules themselves are arranged parallel to the substrate surface. Accordingly, the viewer can see the long axes of liquid crystal molecules from all directions, and the viewing angle characteristic is improved.

However, the IPS mode liquid crystal display as described above also includes the following problems.

It is well known that refractive anisotropy(or birefringence, $\Delta n$) occurs due to the difference in lengths of the long and the short axes. The refractive anisotropy $\Delta$ also varies according to the observer's viewing directions. Therefore a selected color can be shown in the region where the polar angle is of 0 degree and the azimuth angle is in the range of degrees 0, 90, 180 and 270, even in the white state screen. This is regarded as color shift and a more detailed description thereof is attached with reference to equation 1.

$$T \approx T_0 \sin^2(2\chi) \cdot \sin^2(\pi \cdot \chi n d/\lambda) \ldots \quad \text{equation 1}$$

wherein, T: transmittance;

$T_0$: transmittance to the reference light;

$\chi$: angle between an optical axis of liquid crystal molecule and a polarizing axis of the polarizing plate;

$\Delta$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta$ nd/$\lambda$ should be $\pi/2$ according to the equation 1. As the $\Delta$ nd varies with the birefringence difference of the liquid crystal molecules depending on the viewing directions, the value of $\lambda$ varies so as to make $\Delta$ d/$\lambda$ to be $\pi/2$. According to this condition, the color corresponding to the varied wavelength $\lambda$ appears in the screen.

Accordingly, as the value of $\Delta$ n relatively decreases at the viewing directions "a" and "c" toward the short axes of the liquid crystal molecules, the wavelength of the incident light for obtaining the maximum transmittance relatively decreases. Consequently, a blue color having a shorter wavelength than a white color can be looked in the screen.

On the other hand, as the value of $\Delta$ n relatively increases at the viewing directions "b" and "d" toward the short axes of the liquid crystal molecules, the wavelength of the incident light relatively increases. Consequently, a yellow color having a longer wavelength than the white color can be looked in the screen.

Deterioration is caused in the resolution of IPS mode liquid crystal display.

Since the counter electrode 12 and the pixel electrode 14 of the IPS mode liquid crystal display are made of opaque metal layers, an aperture area of the liquid crystal display decreases, and the transmittance thereof also decreases. In addition, so as to obtain an appropriate brightness, a backlight with high intensity must often be used and thus electrical consumption increases, which is often undesirable.

To solve these limitations, a counter electrode 12 and a pixel electrode 14 made of transparent material have been proposed. In such a liquid crystal liquid display the aperture ratio is often increased, but the transmittance is often not improved. To produce an in-plane electric field, the distance l between the electrodes 12 and 14 must often be set to be greater than the cell gap d. To obtain an appropriate intensity of the electric field, the electrodes 12 and 14 have relatively large dimension of width, for example, 10 to 20μm.

However, if the electrodes have such a large dimension of width, the liquid crystal molecules positioned right above the upper surfaces of the electrodes 12 and 14 do not move thereby forming equipotential lines. As a result, since the liquid crystal molecules positioned right above the upper surfaces of the electrodes continue to hold an initial configuration even in the presence of the electric field, the transmittance is increased little.

SUMMARY OF THE INVENTION

Accordingly, it is an object of the present invention to provide a liquid crystal display which prevents the occurrence of color shift thereby improving picture quality.

It is another object of the present invention to provide a liquid crystal display capable of improving its aperture ratio and transmittance.

To accomplish the foregoing objects, the present invention provides a high aperture ratio and high transmittance liquid crystal display preventing color shift comprising:

an upper substrate and a lower substrate opposed and separated by selected distance;

a liquid crystal layer including a plurality of liquid crystal molecules and interposed between inner surfaces of the upper and lower substrates;

a first electrode formed on the inner surface of the lower substrate; and a second electrode formed on the inner surface of the lower substrate, wherein the first electrode and the second electrode form an electric field for driving the liquid crystal molecules;

wherein in the absence of electric field between the first and second electrodes, the liquid crystal molecules are aligned such that their long axis are parallel to surfaces of the substrates in a first direction;

wherein after a selected voltage is applied therebetween, first and second diagonal electric fields are simultaneously formed in a pixel, the two diagonal electric fields are formed to be symmetrical with respect to the first direction;

wherein the first and second electrodes are made of transparent materials;

wherein the distance between the first and second electrodes is shorter than the distance between the upper and lower substrates;

wherein widths of the first and second electrodes are determined such that liquid crystal molecules overlying the two electrodes are driven by the electric field generated between the first and second electrodes.

The present invention, also provides a high aperture ratio and high transmittance liquid crystal display preventing color shift comprising: an upper substrate and a lower substrate opposed to be separated by selected distance;

a liquid crystal layer including a plurality of liquid crystal molecules and interposed between inner surfaces of the upper and lower substrates;

a gate bus line and a data bus line formed in the lower substrate in a matrix configuration thereby defining pixel regions;

a counter electrode formed at each pixel region in the lower substrate and the counter electrode having a body of a rectangular frame shape; a first branch disposed parallel to the gate bus line, connecting lengthwise sides of the body and dividing a region surrounded by the body into a first space and a second space; and a plurality of second and third branches diverged from the body or the first branch toward the first and second spaces as diagonal lines respectively;

a pixel electrode formed at each pixel region in the lower substrate, the pixel electrode forming an electric field together with the counter electrode, the pixel electrode having a first bar overlapped with one of those surfaces lengthwise sides of the body of the counter electrode and disposed parallel to the data bus line; a second bar diverged from the first bar and overlapped with the first branch of the counter electrode; a plurality of third and fourth bars diverged from the first and second bars toward the first and second spaces respectively as diagonal lines, wherein the third bar is interposed between the second branches and the fourth bar is interposed between the third branches;

a switching means formed adjacent to an intersection of the gate bus line and the data bus line for transmitting a signal from the data bus line to the pixel electrode; and homogeneous alignment layers interposed between the lower substrate and the liquid crystal layer and between the upper substrate and the liquid crystal layer, wherein the counter electrode and the pixel electrode are formed in the lower substrate;

wherein the homogeneous alignment layer formed at the lower substrate has a rubbing axis which is parallel to the gate bus line and the data bus line, and the homogeneous alignment layer formed at the upper substrate has a rubbing axis which is anti-parallel to the rubbing axis of the homogeneous alignment layer formed at the lower substrate;

wherein the diagonal branches in the same space are disposed parallel to each other, and the second branch and the third bar in the first space make an angle θ with the first direction, the third branch and the fourth bar in the second space make an angle −θ with the first branch;

wherein the counter and pixel electrodes are made of transparent materials;

wherein the distance between the second branch of the counter electrode and the third bar of the pixel electrode, and the distance between the third branch of the counter electrode and the fourth bar of the pixel electrode are smaller than the distance between the upper and lower substrates;

wherein widths of the second, third branches and the third, fourth bars are determined such that liquid crystal molecules overlying the diagonal branches are substantially driven by the electric field.

The present invention further provides a high aperture ratio and high transmittance liquid crystal display preventing color shift comprising:

an upper substrate and a lower substrate opposed one another and separated by a selected distance;

a liquid crystal layer including a plurality of liquid crystal molecules, interposed between inner surfaces of the upper and lower substrates;

a gate bus line and a data bus line formed in the lower substrate in a matrix configuration thereby defining pixel regions;

a counter electrode formed at each of the pixel regions of the lower substrate and shaped as a rectangular plate;

a pixel electrode formed at each pixel region of the lower substrate, the pixel electrode forming an electric field together with the pixel electrode, the pixel electrode having a first bar overlapped with the counter electrode and disposed parallel to the data bus line; a second bar diverging from the first bar and overlapped with the counter electrode, wherein the second bar divides the counter electrode region into a first space and a second space; a plurality of third and fourth bars diverged from the first and second bars toward the first and second spaces respectively as diagonal lines wherein the third bar is interposed between the second branches and the fourth bar is interposed between the third branches;

a switching means formed at an intersection of the gate bus line and the data bus line for transmitting a signal from the data bus line to the pixel electrode; and homogeneous alignment layers interposed between the lower substrate and the liquid crystal layer and between the upper substrate and the liquid crystal layer, wherein the counter electrode and the pixel electrodes are formed in the lower substrate;

wherein the homogeneous alignment layer formed at the lower substrate has a rubbing axis which is parallel to the gate bus line and the data bus line, and the homogeneous alignment layer formed at the upper substrate has a rubbing axis which is anti-parallel to the rubbing axis of the homogeneous alignment layer formed at the lower substrate;

wherein the diagonal branches in the same space are disposed parallel to each other, and the second branch and the third bar in the first space make an angle θ with the first branch of the counterdectrode, the third branch and the fourth bar in the second space make an angle −θ with the first branch of the counter electode;

wherein the counter and pixel electrodes are made of transparent materials;

wherein the distance between the second branch of the counter electrode and the third bar of the pixel electrode, and the distance between the third branch of the counter electrode and the fourth bar of the pixel electrode are smaller than the distance between the upper and lower substrates; and wherein widths of the second, third branches and the third, fourth bars are determined such that liquid crystal molecules overlying the diagonal branches are substantially driven by the electric field.

Herein, the liquid crystal display is characterized in that a first polarizing plate is disposed at an outer surface of the lower substrate and a second polarizing plate is disposed at an outer surface of the upper substrate, and a polarizing axis of the first polarizing plate is coincided with a rubbing axis of the lower substrate and a polarizing axis of the second polarizing plate is perpendicular to the polarizing axis of the first polarizing plate. Furthermore, a liquid crystal of negative dielectric anisotropy can be used when the angle θ is set in the range of 0~45°, wherein a liquid crystal of positive dielectric anisotropy can be used when the angle θ is set in the range of 45~90°.

DETAILED DESCRIPTION OF THE PREFERRED EMBODIMENTS

Hereinafter, the preferred embodiments of the present invention will be described with reference to the attached drawings.

First Embodiment

Figure 1:
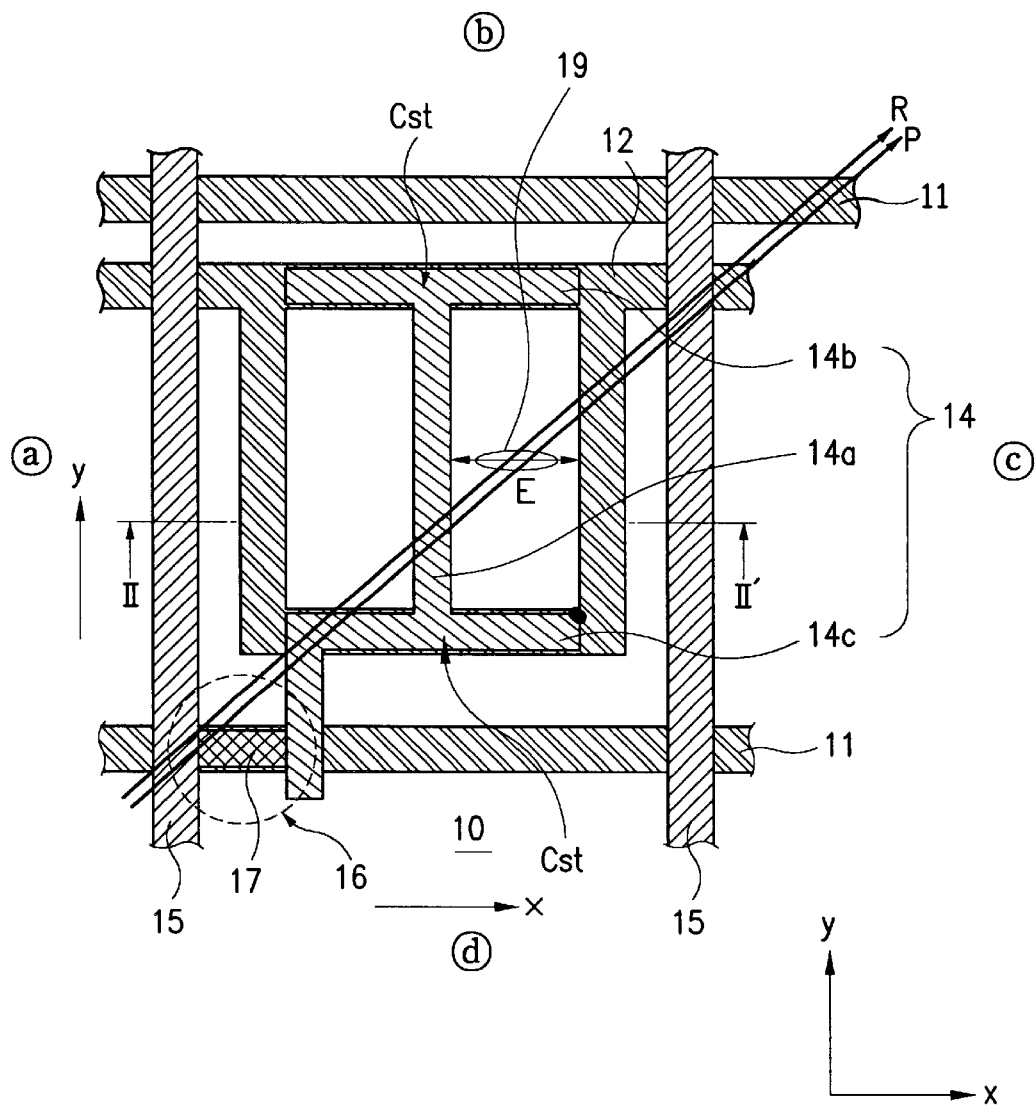
FIG. 1 is a plan view showing a lower substrate of a conventional IPS mode liquid crystal display.
Figure 2:
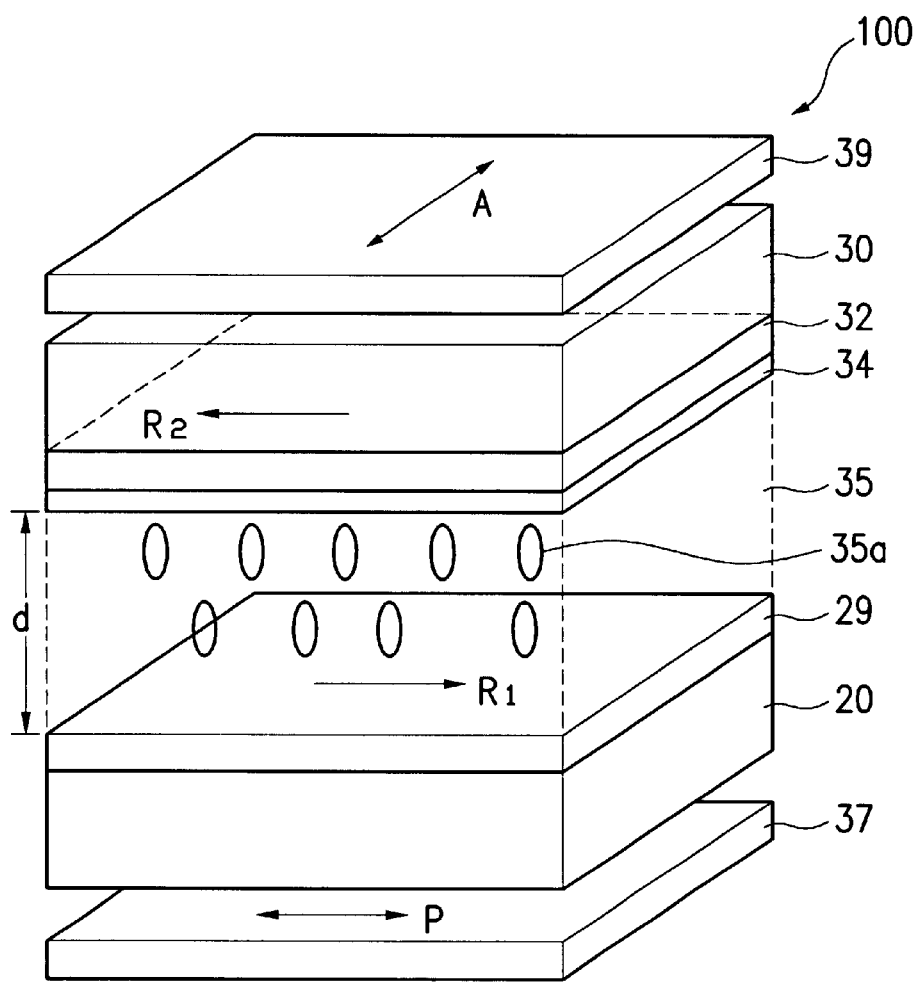
FIG. 2 is a perspective view showing a liquid crystal panel according to a first embodiment of the present invention.
Figure 3:
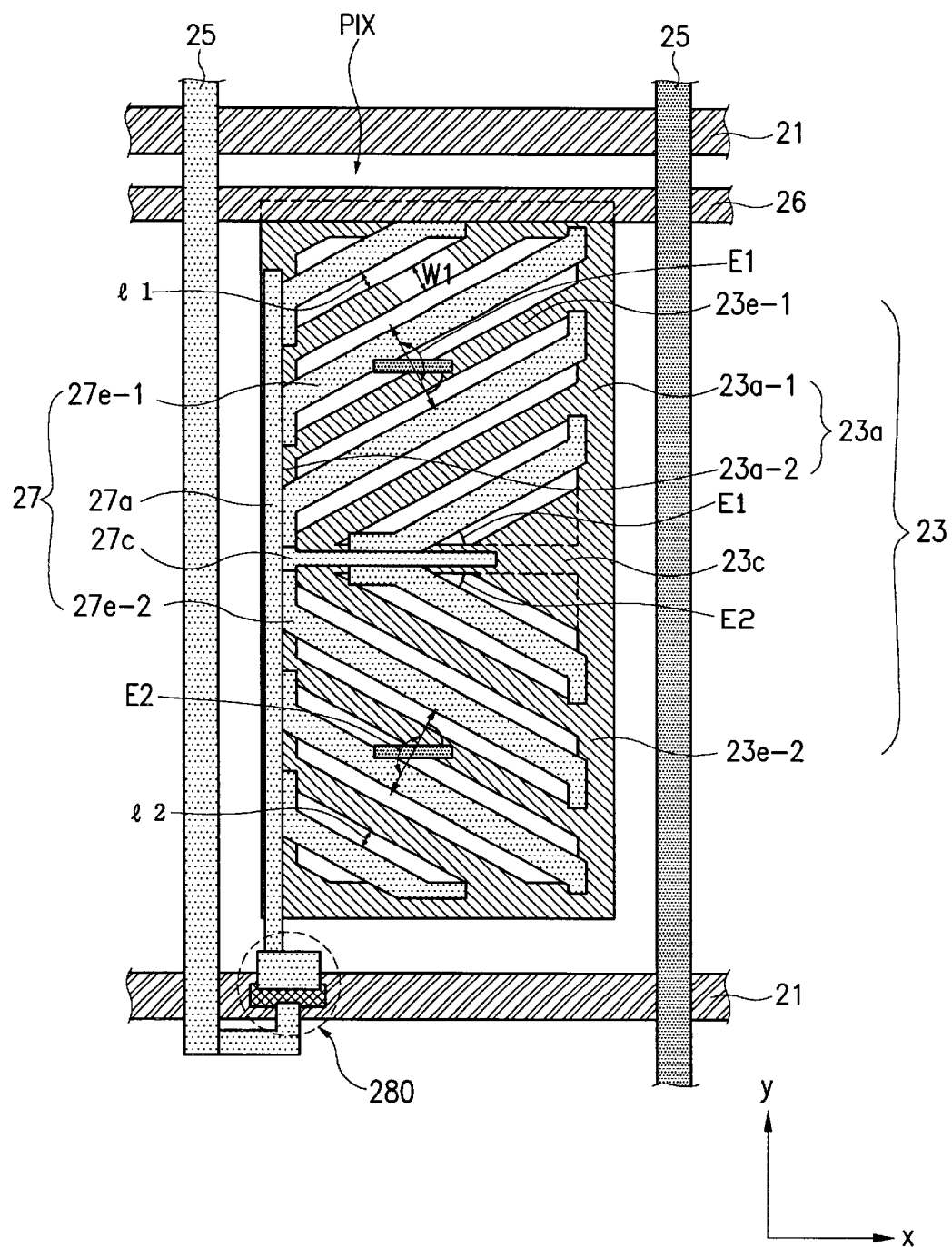
FIG. 3 is a plan view showing a lower substrate according to the first embodiment of the present invention.
Figure 4:
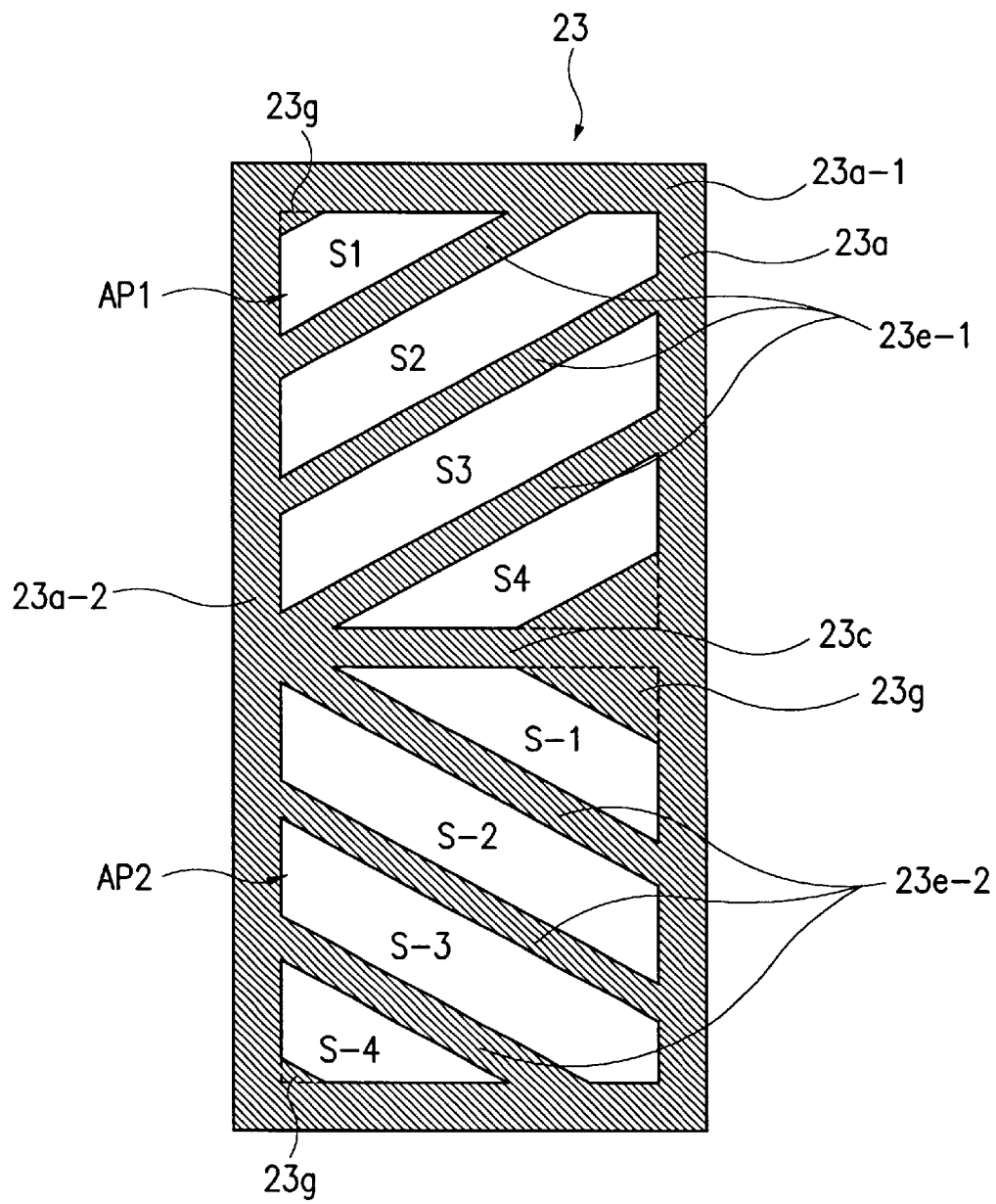
FIG. 4 is a plan view showing a counter electrode according to the first embodiment of the present invention.
Figure 5:
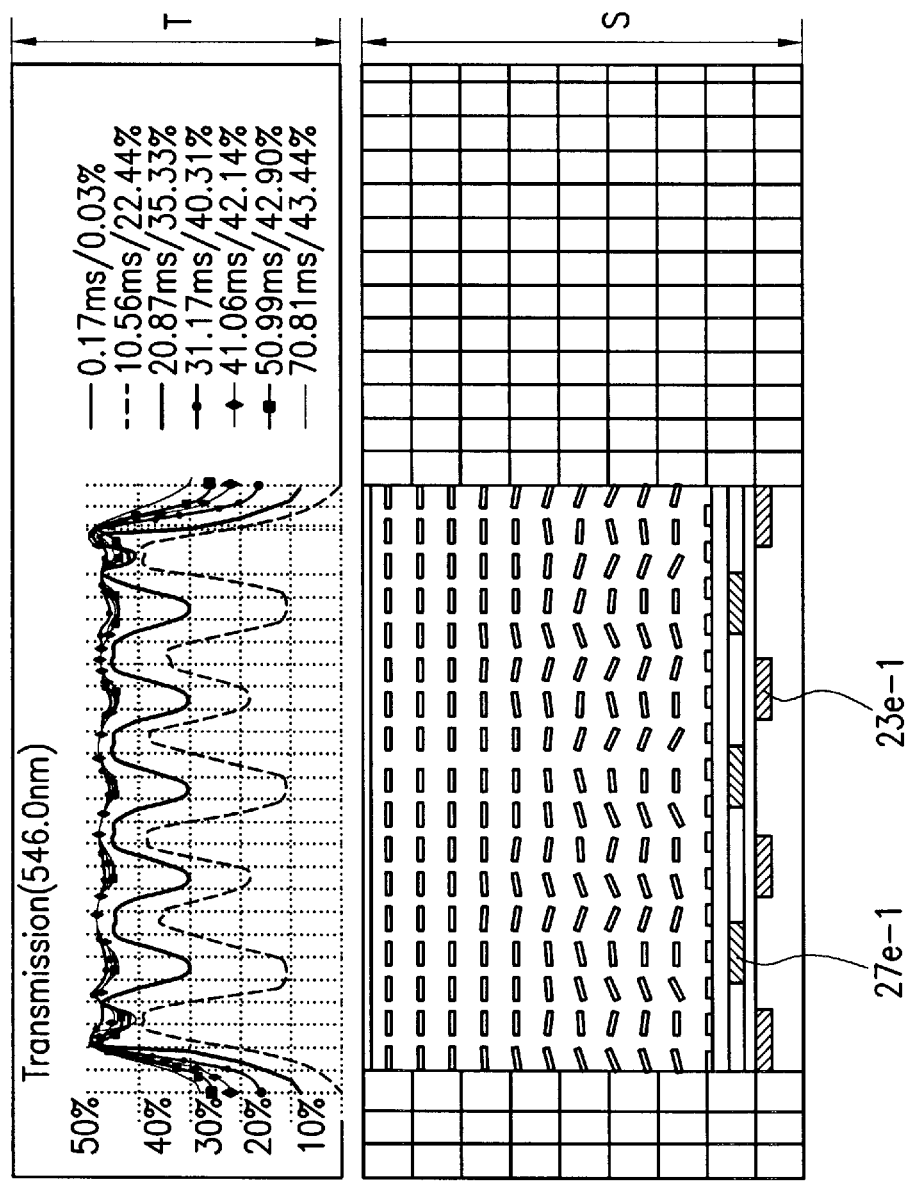
FIG. 5 is a simulation result according to the first embodiment of the present invention.

FIG. 2 is a perspective view showing a liquid crystal panel according to a first embodiment of the present invention, FIG. 3 is a plan view showing a lower substrate according to the first embodiment of the present invention, FIG. 4 is a plan view showing a counter electrode according to the first embodiment of the present invention, and FIG. 5 is a simulation result according to the first embodiment of the present invention.

Referring to FIGS. 2 and 3, a liquid crystal panel 100 is formed by disposing a lower substrate 20 and an upper substrate 30 opposite to each other with a selected distance. Herein, at least one of the lower substrate 20 and the upper substrate 30 is made of a transparent material. Further, the distance between both substrates 20,30 is referred as to a cell gap d and the cell gap in the present invention is approximately 3.9 $\mu$m.

As show in FIG. 3, a gate bus line 21 is extended in an x direction and a data bus line 25 is extended in a y direction, which is substantially perpendicular to the x direction, thereby defining a pixel PIX. Further, the pixel PIX has a rectangular shape that has a ratio of width to length of approximately 1:3. Although not shown in the drawing, an insulating layer is interposed between the gate bus line 21 and the data bus line 25 thereby electrically insulating therebetween.

A counter electrode 23 made of a transparent metal layer, for instance indium tin oxide(ITO), is formed in each pixel PIX. FIG. 4 illustrates only the counter electrode 23. Referring to FIG. 4, the counter electrode 23 includes a body 23$a$ of a rectangular frame shape. In the drawing, the reference numeral 23$a$-1 stands for a portion of the body 23$a$ in the x direction and the reference numeral 23$a$-2 is a portion of the body 23$a$ in the y direction. The counter electrode 23 also includes a first branch 23$c$ which connects the portions 23$a$-2 in the y direction. Herein, the first branch 23$c$ is parallel to the x direction and is disposed at the center of the body 23$a$ thereby dividing a region surrounded by the body 23$a$ into a first space AP1 and a second space AP2. Preferably, the first space AP1 and the second space AP2 are of an equal dimension. The counter electrode 23 further includes a plurality of second and third branches 23$e$-1, 23$e$-2 which are disposed in the form of diagonal lines with respect to the first branch 23$c$ within the first space AP1 and the second space AP2. The second and third branches 23$e$-1, 23$e$-2 divide the first space AP1 and the second space AP2 respectively thereby dividing those spaces AP1,AP2 into a plurality of sub spaces s1~s4, s-1~s-4. Herein, the second branch 23$e$-1 and the third branch 23$e$-2 are disposed parallel each other with a regular distance or a random distance. The second branch 23$e$-1 and the second branch 23$e$-2 are disposed symmetrically with respect to the first branch 23$c$ and have a selected angle θ with the first branch 23$c$.

Furthermore, to prevent an edge electric field occurring at the corners of the first space AP1 and the second space AP2, which is not desired, a rib 23$g$ is formed at a selected corner in the counter electrode 23. A detailed description regarding the occurrence of edge electric fields, is disclosed in U.S. patent application Ser. No. 09/207,872. The rib 23$g$ has a right-angled triangle shape. The rib 23$g$ formed in the first space AP1 is inserted at right-angled corners of sub spaces 1 and 4(s1,s4) so that the hypotenuse of the rib 23$g$ is parallel to the second branch 23$e$-1. Also, in the second space AP2 the rib 23$g$ is inserted at right-angled corners of sub spaces 1 and 4(s-1,s-4) so that the hypotenuse of the rib 23$g$ is parallel to the third branch 23$e$-2.

A pixel electrode 27 is also made of a transparent metal layer, such as ITO layer in each pixel PIX. As disclosed, the pixel electrode 27 is formed on the counter electrode 23 with intervening a gate insulating layer(not shown). The pixel electrode 27 includes a first bar 27$a$ which is overlapped with a selected portion of the body 23$a$ of the counter electrode 23. The first bar 27$a$ is overlapped with one of the body 23$a$ which is parallel to the y direction. Preferably, the first bar 27$a$ is disposed to overlap with the body 23$a$-2 adjacent to the data bus line 25 which applies signal voltages to the corresponding pixel PIX. The width of the first bar 27$a$ of the pixel electrode 27 is equal to or smaller than that of the body 23$a$-2. The pixel electrode 27 also includes a second bar 27$c$ that is overlapped with the first branch 23$c$ of the counter electrode 23 and one end thereof is connected to the first bar 27$a$. The width of the second bar 27$c$ is equal to or smaller than that of the first branch 23$c$ of the counter electrode 23 and the second bar 27$c$ is extended in the x direction. The pixel electrode 27 further includes a third bar 27$e$-1 and a fourth bar 27$e$-2 where their respective ends are connected to the first bar 27$a$ or the second bar 27$c$ and they are branched in the form of diagonal lines toward the first space AP1 and the second space AP2 respectively. The third bar 27$e$-1 and the fourth bar 27$e$-2 divide the sub spaces s1~s4, s-1~s-4. The third bar 27$e$-1 is parallel to the second branch 23$e$-1 of the counter electrode 23 and the fourth bar 27$e$-2 is parallel to the third branch 23$e$-2. The respective third bars 27$e$-1 are interposed between the second branches 23$e$-1 and the respective fourth bars 27$e$-2 are interposed between the third branches 23$e$-2. Herein, at least the ends of one of the third and fourth bars 27$e$-1,27$e$-2 of the pixel electrode 27 are bent to a selected direction so as to reduce the edge electric field being generated at corners of the sub spaces s1~s4, s-1~s-4. Preferably, the bending portions of the third and fourth bars 27$e$-1,27$e$-2 of the pixel electrode 27 are bent to greater angles between the angles made by intersecting the third bar 27$e$-1 and the body 23$a$ of the counter electrode 23, by intersecting the fourth bar 27$e$-2 and the body 23$a$, by intersecting the third bar 27$e$-1 and the first branch 23$c$ of the counter electrode 23, and by intersecting the fourth bar 27$e$-2 and the first branch 23$c$ respectively. The bending portions are turned along inner side of the body 23$a$ or the first branch 23$c$.

Herein, the second branch 23$e$-1 and the third bar 27$e$-1 make an angle θ° with respect to the first branch 23$c$ of the counter electrode 23, the third branch 23$e$-2 and the fourth bar 27$e$-2 make an angle −θ° with respect to the first branch 23$c$ of the counter electrode 23.

A distance l1 between the second branch 23$e$-1 and adjacent third bar 27$e$-1 of the pixel electrode 27 is almost equal to a distance 2 between the third branch 23$e$-2 of the counter electrode 23 and adjacent fourth bar 27$e$-2 of the pixel electrode 27. The distances l1 and l2 are smaller than the cell gap d. Further, a ratio of the width of the second and third branches 23$e$-1,23$e$-2 or the width of the third and fourth bars 27$e$-1,27$e$-2 to the distances l1, l2 is 1 or more. In the present embodiment, the distances l1, l2 are preferably set in the range of 0.5~1.5$\mu$m, or more preferably 1$\mu$m.

As noted above, if the distances l1, l2 are greater than the cell gap d, there may be formed a fringe field between the counter electrode 23 and the pixel electrode 27 that the fringe field affects upper portions of the electrodes 23,27.

A storage capacitor is formed at each overlapping portion of the counter electrode 23 and the pixel electrode 27. That is to say, the storage capacitor is formed between the body 23$a$ of the counter electrode 23 and the first bar 27$a$ of the pixel electrode 27, between the first branch 23$c$ of the counter electrode 23 and the second bar 27c of the pixel electrode 27, and between the body 23a of the counter electrode 23 and the bending portions of the third and fourth bars 27e-1,27e-2 of the pixel electrode 27. The reference numeral 26 in FIG. 3 stands for a common signal line for transmitting common signals to the counter electrode 23.

Adjacent to the intersection of the gate bus line 21 and the data bus line 25, a thin film transistor 280 is disposed as a switching means for transmitting a signal of the data bus line 25 to the pixel electrode 27 when the gate bus line is selected. Herein, the gate bus line 21 becomes a gate electrode for the thin film transistor 280 and the data bus line 25 becomes a source electrode for the thin film transistor 280. Further, the first bar 27a of the pixel electrode 27 extends to the thin film transistor 280, and becomes a drain electrode for the thin film transistor 280.

A first alignment layer 29 is formed on a surface of a resultant structure as constituted above, as shown in FIG. 2. At this time, the first alignment layer 29 is a homogeneous alignment layer having a pretilt angle of approximately below 5° and is rubbed in the x direction. The reason for rubbing the first alignment layer 29 in the x direction is that it is expected to obtain the maximum transmittance.

A color filter 32 is disposed at the inner surface of the upper substrate 30, and a second alignment layer 34 is formed on a surface of the color filter 32. The second alignment layer 34 is also a homogeneous alignment layer and is rubbed in a −x direction, i.e. it is rubbed in an anti-parallel manner with respect to the first alignment layer 29.

A liquid crystal layer 35 is interposed between the upper substrate 30 and the lower substrate 20. Dielectric anisotropy of the liquid crystal layer 35 is determined by an angle between the x direction and the electric field being formed between the second and third branches of the counter electrode, and between the third and fourth bars of the pixel electrode. When the angle between the electric field and the x direction is below 45°, a material of negative dielectric anisotropy is used, and then when the angle is 45°~90°, a material of positive dielectric anisotropy is used thereby obtaining the maximum transmittance.

The transmittance of a general liquid crystal display can be described according to the equation 1 as above. That is to say, the maximum transmittance is obtained when the angle $\chi$ between the optical axes of liquid crystal molecules and the polarizing axis of the polarizer is 45°. Accordingly, to obtain the maximum transmittance, the twist angle of liquid crystal molecule should be over 45°. Therefore the liquid crystal material of negative dielectric anisotropy is used in the present embodiment, since if the angle θ is set, for instance, in the range of 60~88°, the angle between the electric field and the x direction becomes 90−θ, i.e. 2°~30°.

In addition, the refractive anisotropy of liquid crystal molecules within the liquid crystal layer 35 is set 0.05~0.15 so that a value of phase retardation, i.e. the product of the refractive anisotropy and the cell gap becomes 0.2~0.6μm.

A first polarizing plate 37 is disposed at an outer surface of the lower substrate 20, and a second polarizing plate 39 is disposed at an outer surface of the upper substrate 30. Herein, a polarizing axis P of the first polarizing plate 37 is disposed in the x direction which is coincided with the rubbing axis R1 of the first alignment layer 29, and a polarizing axis A of the second polarizing plate 39 is disposed in the y direction which is perpendicular to the polarizing axis P of the first polarizing plate 37.

Operation of the liquid crystal display constituted as above is given below.

There is no electric field between the counter electrode 23 and the pixel electrode 27 when the gate bus line 21 is not selected since no signal is transmitted to the pixel electrode 29. And then, the liquid crystal molecules 35a are arranged such that their long axes are parallel to surfaces of the substrates 20,30 under the influence of the first and second alignment layers 29,34. Therefore, an incident light across the first polarizing plate 37 passes the long axes of the liquid crystal molecules and its polarizing state does not change. Consequently, the light to pass the liquid crystal layer 35 can not pass the second polarizing plate 39 whose polarizing axis A is perpendicular to the polarizing axis P of the first polarizing plate 37. The screen shows a dark state.

On the other hand, when a scanning signal is applied to the gate bus line 21 and a display signal is applied to the data bus line 25, the thin film transistor 280 formed adjacent to the intersection of the gate bus line 21 and the data bus line 25 is turned on thereby transmitting the display signal to the pixel electrode 27. Electric fields E1,E2 are formed between the counter electrode 23 to which a common signal is continuously transmitted and the pixel electrode 27. The electric fields E1,E2 are substantially formed between the second branch 23e-1 of the counter electrode 23 and the third bar 27e-1 of the pixel electrode 27, and between the third branch 23e-2 and the fourth bar 27e-2 of the pixel electrode 27. Herein, the electric field E1 is formed in the first space AP1 and the electric field E2 is formed in the second space AP2. Since the electric fields E1,E2 in the form of diagonal lines are formed as normal lines of the second and third branches 23e-1, 23e-2. The electric fields E1 and E2 are symmetrically formed with respect to the first branch 23c of the counter electrode 23. Herein, the intensity ratio of the electric field E1 in the first space AP1 to the electric field E2 in the second space AP2 is set in the range of 0.3~1.3, preferably 1.

According to the electric fields E1,E2, the liquid crystal molecules 35a, arranged parallel to the x direction and the substrate, are twisted such that their long axes are arranged parallel to the electric fields E1,E2. At this time, the electric fields E1,E2 are formed to make a symmetry within a pixel PIX in the form of diagonal lines, then the liquid crystal molecules 35a are rearranged to be parallel to the directions of the electric fields E1,E2.

Accordingly, one pixel is divided into a first domain where the liquid crystal molecules are aligned in the form of the first electric field E1, and a second domain where the liquid crystal molecules are aligned in the form of the second electric field E2 thereby forming two domains. When the liquid crystal molecules 35a are arranged as described above, the viewer at every azimuth angle can see the long and short axes of the liquid crystal molecules 35a simultaneously, therefore the refractive anisotropy of liquid crystal molecules is compensated. Consequently, there is no more color shift occurrence.

Further, the counter and pixel electrodes 23,27 are made of transparent metal layers, and the distance and width of the second(or third) branch and the third(or fourth) bar is adjusted such that the electric fields can affect the second and third branches 23e-1,23e-2 and the third and fourth bars 27e-1,27e-2. Therefore, the liquid crystal molecules on the electrodes 23,27 are moved, and the aperture ratio and the transmittance are improved remarkably.

FIG. 5 is a simulation result when the liquid crystal display is constituted as described above. The reference symbol "S" means a section of the liquid crystal and the lower substrate in the liquid crystal display and the reference symbol "T" stands for the transmittance. Referring to FIG.

5, it is possible to obtain a transmittance of 43.44% which is regarded to as relatively high transmittance value in the lapse of approximately 70.81 ms. In addition, as shown in the drawing, the electric fields affect not only between the second branch 23e-1 and the third bar 27e-1 but also the upper portions of the second branch 23e-1 and the third bar 27e-1 thereby aligning all liquid crystal molecules. Accordingly, uniform transmittance is obtainable at every point in the screen.

Furthermore, a relatively high transmittance of 40% in the lapse of 31.17 ms is obtained due to a dense structure of the second branch 23e-1 and the third bar 27e-1.

Second Embodiment

Figure 6:
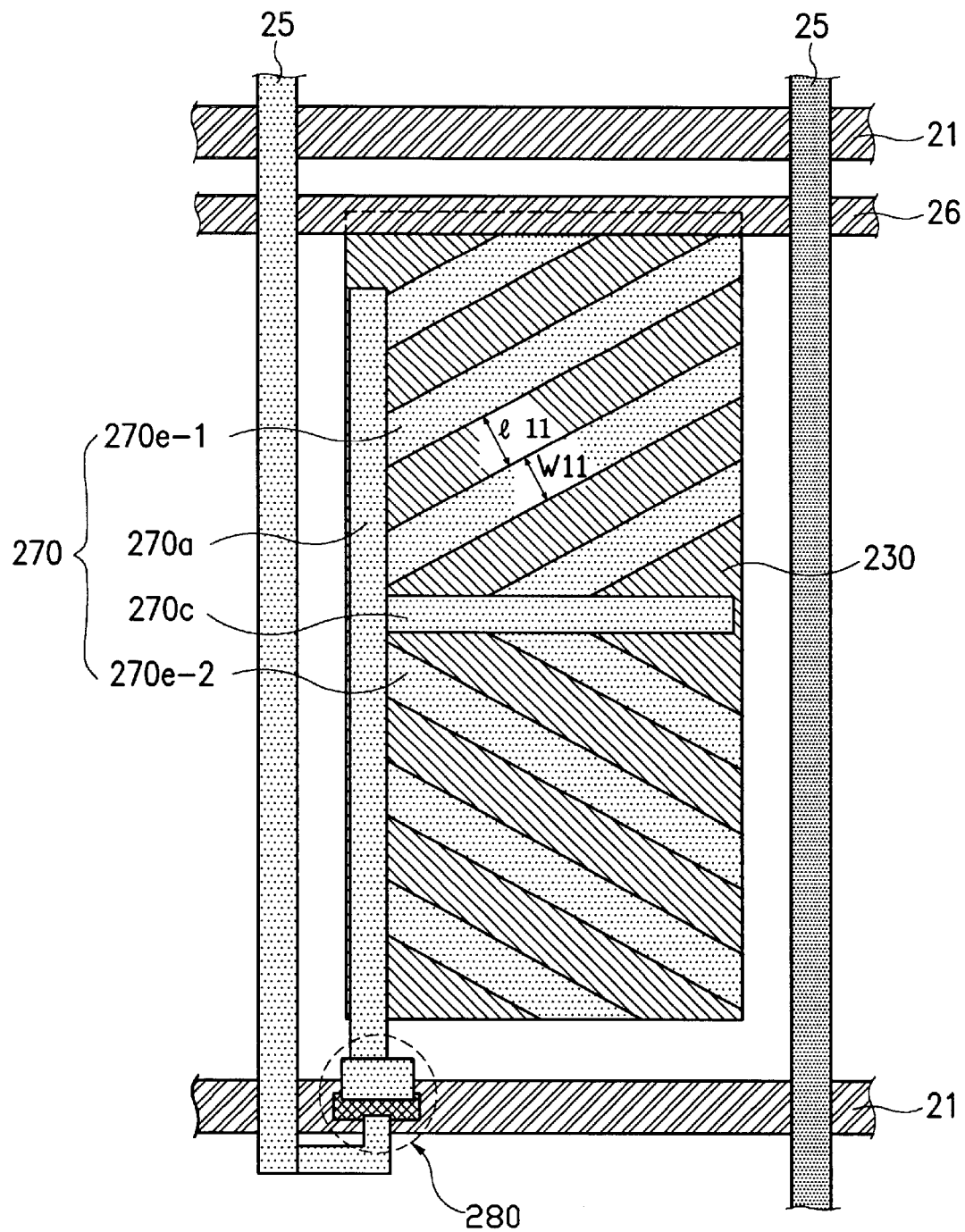
FIG. 6 is a plan view showing a lower substrate according to a second embodiment of the present invention.
Figure 7:
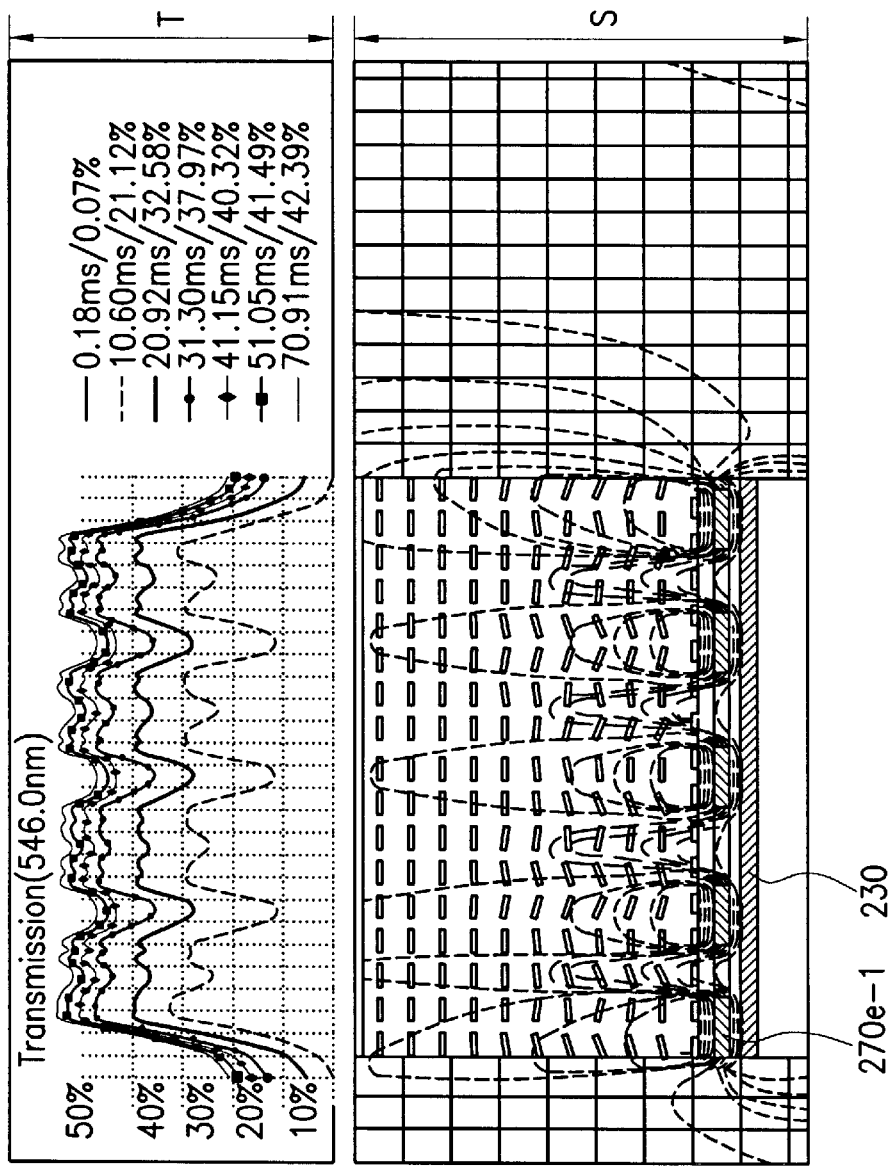
FIG. 7 is a simulation result according to the second embodiment of the present invention.

FIG. 6 is a plan view showing a lower substrate according to a second embodiment of the present invention. FIG. 7 is a simulation result according to the second embodiment of the present invention.

The present embodiment has a similar arrangement to the first embodiment as in the gate bus lines, the data bus lines, the thin film transistor, the common electrodes, the first and second alignment layers and the first and second polarizing plates except the arrangement of the counter electrode and the pixel electrode.

That is to say, as shown in FIG. 6, a counter electrode 230 according to the present embodiment is shaped of a rectangular plate and is made of a transparent material.

A pixel electrode 270 is disposed to overlap the counter electrode 230 and is made of a transparent metal layer.

The pixel electrode 270 includes a first bar 270a extended in the y direction at top edge of the counter electrode 230 adjacent to its corresponding data bus line, and a second bar 270c extended from the first bar 270a toward the x direction. Herein, an upper portion of the second bar 270c becomes a first space AP1 and a lower portion of the second bar 270c becomes a second space AP2. The pixel electrode 270 also includes a plurality of third and fourth bars 270e-1, 270e-2 which are extended from the first bar 270a or the second bar 270c toward a first space AP1 and a second space AP2 respectively.

Herein, the ratio(W11/l11) of the width w11 of the third bar 270e-1 to the distance l11 between adjacent third bars 270e-1 is set preferably in the range of 0.2~5, and the ratio(l11/d) of the distance l11 of the third bars 270e-1 to the cell gap d is set in the range of 0.1~2.

In the present embodiment, the distance between the counter electrode 230 and the pixel electrode 270 is equivalent to the thickness of a gate insulating layer(not shown) and the thickness of the gate insulating layer is preferably smaller than the cell gap.

Additionally, an electric field is formed between the third or fourth bar 270e-1,270e-2 of the pixel electrode 270 and the counter electrode 230 exposed by the third and fourth bars 270e-1,270e-2.

Operation of the liquid crystal display according to the present embodiment is the same as that in the first embodiment.

Further, as shown in FIG. 7, when the liquid crystal display is simulated, a uniform transmittance is obtained. When voltage is applied to the pixel electrode 270, a relatively high transmittance of approximately 37.97% is obtained in the lapse of 31.30 ms.

As described in detail, according to the embodiments of the present invention, there are two diagonal electric fields which are disposed symmetrical to each other in a pixel. Therefore, liquid crystal molecules in the pixel are divided into two directions which are symmetrical to each other, in the presence of electric field, i.e. dual-domain is generated. Consequently, the viewer can see the long axes and short axes of liquid crystal molecules at all points in the screen, and the color shift is prevented.

Furthermore, according to the present invention the counter electrodes and pixel electrodes are made of transparent metal layers and their widths and distance are determined such that liquid crystal molecules on the electrodes are all driven by the fringe field. Accordingly, the liquid crystal display improves its transmittance and aperture ratio.

Further, a contrast distribution at a rubbing direction is improved. The rubbing direction in the present invention is at 90° or 180° which coincides with the viewer's viewing direction. Hence, the contrast in the viewer's direction is remarkably improved.

Various other modifications will be apparent to and can be readily made by those skilled in the art without departing from the scope and spirit of the present invention.

What is claimed is:

1. High aperture ratio and high transmittance liquid crystal display preventing color shift comprising:

an upper substrate and a lower substrate opposed and separated by a selected distance, wherein the upper and the lower substrate have defined a plurality of subpixels;

a liquid crystal layer including a plurality of liquid crystal molecules and interposed between inner surfaces of the upper and lower substrates;

a first electrode formed on the inner surface of the lower substrate; and a second electrode formed on the inner surface of the lower substrate, wherein the first electrode and the second electrode form a electric field for driving the liquid crystal molecules;

wherein in the absence of electric field between the first and second electrodes, the liquid crystal molecules are aligned such that their long axis are parallel to surfaces of the substrate in a first direction;

wherein after a selected voltage is applied there between, first and second electric fields that are oblique with respect to the first direction are simultaneously formed in a pixel, and the two oblique electric fields are formed to be symmetrical with respect to the first direction;

wherein the first and second electrodes are made of transparent materials;

wherein the distance between the first and second electrodes is shorter then the distance between the upper and lower substrates;

wherein widths of the first and second electrodes are determined such that liquid crystal molecules overlying the two electrodes are driven by the oblique electric fields generated between the first and second electrodes.

2. The liquid crystal of claim 1, wherein the first electrode further comprises;

a plurality of diagonal branches which make an angle θ with the first direction;

a plurality of diagonal branches which make an angle -θ with the first direction;

wherein the second electrode further comprises;

a plurality of diagonal bars which make an angle θ with the first direction;

a plurality of diagonal bars which make an angle -θ with the first direction;

wherein the diagonal bars of the second electrode are disposed between the diagonal branches of the first electrode respectively.

3. The liquid crystal display of claim 2, wherein the ratio of the distance between the diagonal branches of the first electrode and between the diagonal bars of the second electrode to the width thereof is set over 1.

4. The liquid crystal display of claim 1, further comprising:
a first polarizing plate dispose at an outer surface of the lower substrate, and
a second polarizing plate disposed at an outer surface of the upper substrate,
wherein a polarizing axis of the first polarizing plate is coincided with the first direction or the direction which is perpendicular to the first direction, and
a polarizing axis of the second polarizing plate is perpendicular to the polarizing axis of the first polarizing plate.

5. The liquid crystal display of claim 4, wherein a liquid crystal of negative dielectric anisotropy is used in case an angle of first or second electric field and the first direction is set in the range of 0~45°, wherein a liquid crystal of positive dielectric anisotropy is used in case the angle is set in the range of 45~90°.

6. The liquid crystal display of claim 5, wherein the product of refractive anisotropy of the liquid crystal molecules and the distance between the upper and lower substrates is set in the range of 0.2~0.6 $\mu$m.

7. The liquid crystal display of claim 1, further comprising: a homogeneous alignment layer interposed between the lower substrate that the first electrode and the second electrode are formed therein and the liquid crystal layer, between the upper substrate and the liquid crystal layer, wherein the homogeneous alignment layer formed at the lower substrate has a rubbing axis of the first direction or the direction which is perpendicular to the first direction and the homogeneous alignment layer formed at the upper substrate has a rubbing axis of an anti-parallel direction.

8. High aperture ratio and high transmittance liquid crystal display preventing color shift comprising:
an upper substrate and a lower substrate opposed one another and separated by a selected distance;
a liquid crystal layer, including a plurality of liquid crystal molecules, interposed between inner surfaces of the upper and lower substrates;
a gate bus line and a data bus line formed in the lower substrate in a matrix configuration thereby defining pixel regions;
a counter electrode formed at each of the pixel regions in the lower substrate and having a body of a rectangular frame shape; a first branch disposed parallel to the gate bus line, connecting lengthwise sides of the body and dividing a region surrounded by the body into a first space and a second space; and a plurality of second and third branches diverging from the body or the first branch toward the first and second spaces as diagonal lines respectively;
a pixel electrode formed at each of the pixel regions in the lower substrate, the pixel electrode forming an electric field together with the counter electrode, the pixel electrode having a first bar overlapped with one of the lengthwise sides of the body of the counter electrode and disposed parallel to the data bus line; a second bar diverged from the first bar and overlapped with the first branch of the counter electrode; a plurality of third and fourth bars diverged from the first and second bars toward the first and second spaces respectively as diagonal lines, wherein the third bar is interposed between the second branches and the fourth bar is interposed between the third branches;
a switching means formed adjacent to an intersection of the gate bus line and the data bus line for transmitting a signal from the data bus line to the pixel electrode; and
homogeneous alignment layers interposed between the lower substrate and the liquid crystal layer and between the upper substrate and the liquid crystal layer, wherein the counter electrode and the pixel electrode are formed in the lower substrate;
wherein the homogeneous alignment layer formed at the lower substrate has a rubbing axis which is parallel to the gate bus line and the data bus line, and the homogeneous alignment layer formed at the upper substrate has a rubbing axis which is anti-parallel to the rubbing axis of the homogeneous alignment layer formed at the lower substrate;
wherein the diagonal branches in the same space are disposed parallel to each other, and the second branch and the third bar in the first space make an angle $\theta$ with the first branch of the counter electrode, the third branch and the fourth bar in the second space make an angle $-\theta$ with the first branch of the counter electrode;
wherein the counter and pixel electrodes are made of transparent materials;
wherein the distance between the second branch of the counter electrode and the third bar of the pixel electrode, and the distance between the third branch of the counter electrode and the fourth bar of the pixel electrode are smaller than the distance between the upper and lower substrates;
wherein widths of the second, third branches and the third, fourth bars are determined such that liquid crystal molecules overlying the diagonal branches are substantially driven by the electric field.

9. The liquid crystal display of claim 8, further comprising: a first polarizing plate disposed at an outer surface of the lower substrate and a second polarizing plate disposed at an outer surface of the upper substrate, wherein a polarizing axis of the first polarizing plate is coincided with a rubbing axis of the lower substrate and a polarizing axis of the second polarizing plate is perpendicular to the polarizing axis of the first polarizing plate.

10. The liquid crystal display of claim 8, wherein a liquid crystal of negative dielectric anisotropy is used in case an angle $\theta$ is set in the range of 0~45°, wherein a liquid crystal of positive dielectric anisotropy is used in case the angle $\theta$ is set in the range of 45~90°.

11. The liquid crystal display of claim 8, wherein the product of refractive anisotropy of the liquid crystal and the distance between the upper and lower substrates is set in the range of 0.2~0.6 $\mu$m.

12. The liquid crystal display of claim 8, wherein the ratio of the distance between the second and third branches of the counter electrode and between the third and the fourth bars of the pixel electrode to the width thereof is set over 1.

13. The liquid crystal display of claim 8, wherein the second and the third branches of the counter electrode and the third and fourth bars of the pixel electrode have a length such that they can divide a region surrounded by the body of the counter electrode.

14. The liquid crystal display of claim 8, further comprising a rib for preventing edge electric field generation, the rib disposed at a selected corner of the first or the second space of the counter electrode.

15. The liquid crystal display of claim 8, wherein the rib is shaped of a right-angled triangle and each rib is disposed at a corner such that its hypotenuse is parallel to the diagonal branches.

16. The liquid crystal display of claim 8, wherein at least one end of the third bar or the fourth bar of the pixel electrode is bent to a selected direction along the body or inner surface of the first branch.

17. The liquid crystal display of claim 16, wherein the bending portion is bent to a greater angle between the angles made by intersecting the third bar and the body of the counter electrode, by intersecting the fourth bar and the body, by intersecting the third bar and the first branch of the counter electrode and by intersecting the fourth bar and the first branch respectively.

18. High aperture ratio and high transmittance liquid crystal display preventing color shift comprising:

- an upper substrate and a lower substrate opposed and separated by a selected distance;
- a liquid crystal layer, including a plurality of liquid crystal molecules interposed between inner surfaces of the upper and lower substrates;
- a gate bus line and a data bus line formed in the lower substrate in a matrix configuration thereby defining pixel regions;
- a counter electrode formed at each pixel region of the lower substrate and shaped as a rectangular plate;
- a pixel electrode formed at each pixel region of the lower substrate, the pixel electrode forming an electric field together with the counter electrode, the pixel electrode having a first bar overlapped with the counter electrode and disposed parallel to the data bus line; a second bar diverged from the first bar and overlapped with the counter electrode, wherein the second bar divides the counter electrode region into a first space and a second space; a plurality of third and fourth bars diverged from the first and second bars toward the first and second spaces respectively as diagonal lines;
- a switching means formed at an intersection of the gate bus line and the data bus line for transmitting a signal from the data bus line to the pixel electrode; and
- homogeneous alignment layers interposed between the lower substrate and the liquid crystal layer and between the upper substrate and the liquid crystal layer, wherein the counter electrode and the pixel electrodes are formed in the lower substrate;
- wherein the homogeneous alignment layer formed at the lower substrate has a rubbing axis which is parallel to the gate bus line and the data bus line, and the homogeneous alignment layer formed at the upper substrate has a rubbing axis which is anti-parallel to the rubbing axis of the homogenous alignment layer formed at the lower substrate;
- wherein the diagonal bars in the same space are disposed parallel to each other, and the second bar and the third bar in the first space make an angle θ with the first direction, the third bar and the fourth bar in the second space make an angle −θ with the first branch;
- wherein the counter and pixel electrodes are made of transparent materials;
- wherein the distance between the second branch of the counter electrode and the third bar of the pixel electrode, and the distance between the third branch of the counter electrode and the fourth bar of the pixel electrode are smaller than the distance between the upper an lower substrates; and
- wherein widths of the second, third branches and the fourth bars are determined such that liquid crystal molecules overlying the diagonal branches are substantially driven by the electric field.

19. The liquid crystal display of claim 18, further comprising: a first polarizing plate disposed at an outer surface of the lower substrate and a second polarizing plate disposed at an outer surface of the upper substrate, wherein a polarizing axis of the first polarizing plate coincides with a rubbing axis of the lower substrate and a polarizing axis of the second polarizing plate is perpendicular to the polarizing axis of the first polarizing plate.

20. The liquid crystal display of claim 19, wherein a liquid crystal of negative dielectric anisotropy is used when the angle θ is set in the range of 0–45°, wherein a liquid crystal of positive dielectric anisotropy is used when the angle θ is set in the range of 45–90°.

* * * * *